United States Patent
Ballantyne et al.

(10) Patent No.: US 8,504,684 B1
(45) Date of Patent: Aug. 6, 2013

(54) CONTROL OF DATA STORAGE SYSTEM MANAGEMENT APPLICATION ACTIVATION

(75) Inventors: Robert A. Ballantyne, Mansfield, MA (US); Xue Ming, Acton, MA (US); Kendra Marchant, Arlington, MA (US); Felix Rieper, Cambridge, MA (US); Peter Chen, Charlton, MA (US)

(73) Assignee: EMC Corporation, Hopkinton, MA (US)

( * ) Notice: Subject to any disclaimer, the term of this patent is extended or adjusted under 35 U.S.C. 154(b) by 333 days.

(21) Appl. No.: 12/821,695

(22) Filed: Jun. 23, 2010

(51) Int. Cl.
*G06F 15/173* (2006.01)

(52) U.S. Cl.
USPC .......................................... 709/224; 709/223

(58) Field of Classification Search
USPC .......................................... 709/217–224, 229
See application file for complete search history.

(56) References Cited

U.S. PATENT DOCUMENTS

| | | | |
|---|---|---|---|
| 7,076,691 B1* | 7/2006 | Dobberpuhl et al. | 714/13 |
| 7,200,357 B2* | 4/2007 | Janik et al. | 455/3.02 |
| 7,269,648 B1* | 9/2007 | Krishnan et al. | 709/224 |
| 7,698,531 B2* | 4/2010 | Flemming et al. | 711/173 |
| 7,730,180 B1* | 6/2010 | Krishnan et al. | 709/224 |
| 7,831,795 B2* | 11/2010 | Prahlad et al. | 711/170 |
| 7,912,942 B1* | 3/2011 | Swartzlander et al. | 709/224 |
| 7,920,824 B2* | 4/2011 | Janik et al. | 455/3.02 |
| 8,028,056 B1* | 9/2011 | Krishna et al. | 709/223 |
| 8,086,760 B1* | 12/2011 | Gruttadauria et al. | 710/8 |
| 8,126,963 B1* | 2/2012 | Rimmer | 709/203 |
| 8,131,743 B1* | 3/2012 | Joyce et al. | 707/759 |
| 8,301,974 B2* | 10/2012 | Abu-Surra et al. | 714/758 |
| 2006/0112219 A1* | 5/2006 | Chawla et al. | 711/114 |
| 2006/0253409 A1* | 11/2006 | Ronkainen et al. | 707/1 |
| 2007/0204057 A1* | 8/2007 | Shaver et al. | 709/231 |
| 2007/0204115 A1* | 8/2007 | Abramson | 711/154 |
| 2008/0222381 A1* | 9/2008 | Lam | 711/170 |
| 2010/0198972 A1* | 8/2010 | Umbehocker | 709/226 |
| 2010/0199037 A1* | 8/2010 | Umbehocker et al. | 711/113 |
| 2010/0199276 A1* | 8/2010 | Umbehocker | 718/1 |
| 2010/0251143 A1* | 9/2010 | Thomas et al. | 715/760 |
| 2011/0022812 A1* | 1/2011 | van der Linden et al. | 711/163 |

OTHER PUBLICATIONS

EMC CX4 architecture for NS series Dec. 4, 2008.*
EMC Navisphere Manger Administrator's Guide Published Jul. 2005.*
"EMC Powerlink," EMC Corporation, http://powerlink.EMC.com, 2006.

* cited by examiner

*Primary Examiner* — Sargon Nano
(74) *Attorney, Agent, or Firm* — BainwoodHuang

(57) ABSTRACT

A method for managing data storage system management applications includes executing, by a client device, a first data storage system management application, receiving, by the client device, an execution instruction for execution of a second data storage system management application, and detecting, by the client device, an installation of a second data storage system management application as part of the client device, the second data storage system management application being distinct from the first data storage system management application. If the second data storage system management application is installed on the client device, executing the second data storage system management application, otherwise retrieving the second data storage system management application from a server device and executing the second data storage system management application.

19 Claims, 7 Drawing Sheets

CONTROL OF DATA STORAGE SYSTEM MANAGEMENT APPLICATION ACTIVATION

BACKGROUND

A typical data storage system stores and retrieves data for one or more external client devices. Conventional data storage systems typically include a storage processor and an array of disk drives electrically coupled to the storage processor. The storage processor includes one or more ports, such as fibre channel ports, that allow the client devices to connect to the storage processor and is typically configured to perform load and store operations on the array of disk drives on behalf of the client devices.

Conventional data storage systems also allow the client devices to manage, monitor, and configure the data storage system according to a user's needs. For example, a client device can manage and monitor a CLARiiON™ data storage system, as produced by EMC Corporation of Hopkinton, Mass., using a first application such as the Navisphere Manager, also produced by EMC Corporation. The client device can also update, install, and maintain hardware and applications associated with the data storage system utilizing a second application, such as the Navisphere Service Taskbar (NST), as produced by EMC Corporation. While these management applications are related, the client device maintains the Navisphere Manager and the NST as separate applications. Such separation allows each application to be independently upgraded over time and across different updating schedules.

SUMMARY

With respect to conventional data storage systems, the user may want to launch or execute related but separate data storage system management applications, such as Navisphere Manager and NST, to manage the data storage system. With certain data storage system management applications, such as certain versions of Navisphere Manager, in order to allow launching of NST, Navisphere Manager presents the end user with a link as part of a graphical user interface (GUI) to imply NST functionality. When the user activates the link, Navisphere Manager presents the end user with one or more dialogs that instruct the user to obtain the NST application from a host device, such as a server configured with POWERLINK, as produced by EMC Corporation of Hopkinton, Mass. The user then must navigate to the host device and manually enter secure login credentials to access the host device, such as through POWERLINK. The user then manually searches the host device to locate NST and, once located, must download, install, and run the NST application at the end user's client device to access the functionalities associated with the application. While certain versions of Navisphere Manager allow the user to retrieve NST from a host device, such a process is time consuming and not user-friendly as it requires the user to manually engage a multi-step procedure.

Other data storage system management applications, such as certain versions of Navisphere Manager, are not configured to imply association of NST functionality with the applications. With such data storage system management applications, fewer customers or end users will be aware of the availability of NST as part of the data storage system. Accordingly, because the user is unaware of the NST functionality, the user may contact support personnel for help in managing various aspects of the data storage system. These service calls can be time consuming and costly.

By contrast to previous approaches, embodiments of the invention relate to the control of data storage system management application activation. For example, when executing a first data storage system management application, such as Navisphere Manager, a client device provides to a user, via a graphical user interface, the ability to launch or execute a second data storage system management application, such as an NST application. In response to receiving an execution command from the user, the client device detects whether the second data storage system management application has been previously installed on the client device. If not installed, the client device automatically navigates to and retrieves the second data storage system management application from a server device. With such a configuration, the client device provides a notification to the end user regarding the presence of the second data storage system management application on the system. With such notification, rather than contact support personnel for help in managing various aspects of the data storage system, the user can actively utilize the second data storage system management application to perform system management. Additionally, because the client device is configured to automatically retrieve the second data storage system management application from a host device, the client device allows the user to be minimally involved with the retrieval process, thereby providing the user with a better ease-of-use experience.

In one arrangement, a method for managing data storage system management applications includes executing, by a client device, a first data storage system management application, receiving, by the client device, an execution instruction for execution of a second data storage system management application, and detecting, by the client device, an installation of a second data storage system management application as part of the client device, the second data storage system management application being distinct from the first data storage system management application. If the second data storage system management application is installed on the client device, executing the second data storage system management application, otherwise retrieving the second data storage system management application from a server device and executing the second data storage system management application.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention relate to the control of data storage system management application activation. For example, when executing a first data storage system management application, such as Navisphere Manager, a client device provides to a user, via a graphical user interface, the ability to launch or execute a second data storage system management application, such as an NST application. In response to receiving an execution command from the user, the client device detects whether the second data storage system management application has been previously installed on the client device. If not installed, the client device automatically navigates to and retrieves the second data storage system management application from a server device. With such a configuration, the client device provides a notification to the end user regarding the presence of the second data storage system management application on the system. With such notification, rather than contact support personnel for help in managing various aspects of the data storage system, the user can actively utilize the second data storage system management application to perform system management. Additionally, because the client device is configured to automatically retrieve the second data storage system management application from a host device, the client device allows the user to be minimally involved with the retrieval process, thereby providing the user with a better ease-of-use experience.

Figure 1:
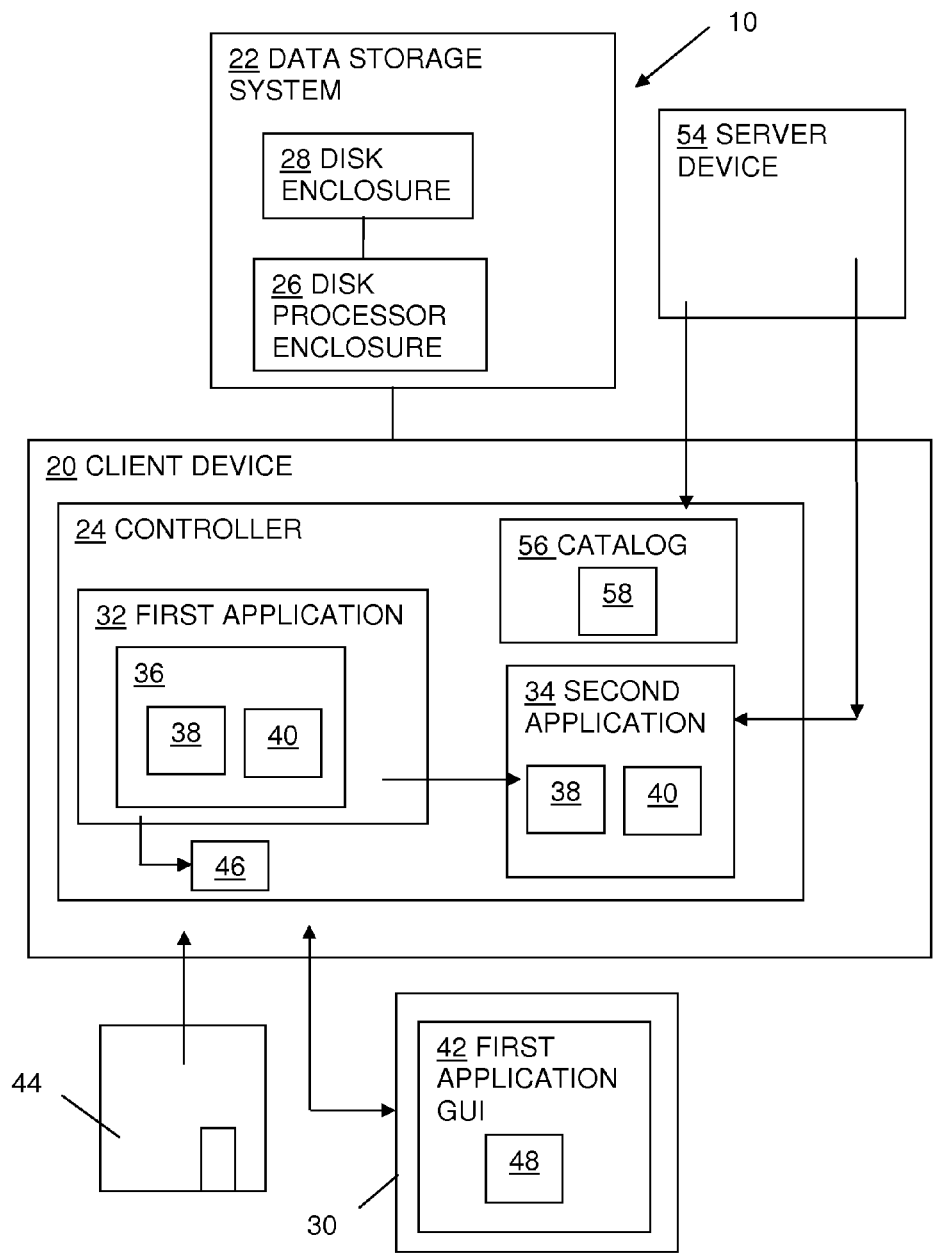
FIG. 1 illustrates a schematic representation of a data storage environment, according to one embodiment.

FIG. 1 illustrates an example arrangement of a data storage environment 10, such as used by an enterprise. As shown, the data storage environment 10 includes a client device 20 disposed in electrical communication with a data storage system 22, such as via a network connection.

The data storage system 22, in one arrangement, includes a disk processor enclosure 26 and one or more disk enclosures 28 disposed in electrical communication with the disk processor enclosure 26. Each of the disk enclosures 28 includes an array of magnetic memory units, such as disk drives or flash drives. For example, each of the disk enclosures 28 includes several disk drives operable to store data received from the client device 20 or to provide data requested from the client device 20. The disk processor enclosure 26 includes one or more controllers or storage processors configured to control certain functions of the data storage system 22. For example, the storage processors are configured to perform load and store operations on the magnetic storage devices of the disk enclosures 28 on behalf of the client device 20. While the data storage system 22 can be configured in a variety of ways, in one arrangement, the data storage system 22 is configured as a storage area network, such as a CLARiiON™ system The client device 20, such as a computerized device, includes a controller 24, such as a memory and a processor. The controller 24 of the client device 20 is configured to execute a first data storage system management application 32 and a second data storage system management application 34. In one arrangement, the first and second data storage system management applications 32, 34 are based on a common code infrastructure, such as applications produced by EMC Corporation of Hopkinton, Mass. For example, the first data storage system management application 32 can be a Navisphere Manager application or a Unisphere application configured to manage and monitor the data storage system 22 and the second data storage system management application 34 can be an NST application or a Unisphere Service Manager (USM) application configured to update, install, and maintain hardware and applications associated with the data storage system 22.

In use, the controller 24 of the client device 20 is configured to control activation of the second data storage system management application 34 while executing the first data storage system management application 32. For example, as will be described in detail below, in response to receiving an execution instruction from a user, the client device 20 is configured to automatically find and retrieve the second data storage system management application 34 within the data storage environment 10. The client device 20 is further configured to then execute the second data storage system management application 34 while continuing to execute the first data storage system management application 32.

In one arrangement, the controller 24 of the client device 20 stores an application for controlling activation of a data storage system management application, such as the second data storage system management application 34. The activation control application installs on the client device 20 from a computer program product 44. In some arrangements, the computer program product 44 is available in a standard off-the-shelf form such as a shrink wrap package (e.g., CD-ROMs, diskettes, tapes, etc.). In other arrangements, the computer program product 44 is available in a different form, such downloadable online media. When performed on the controller 24 of the client device 20, the activation control application causes the client device 20 to automatically find and retrieve the second data storage system management application 34 within the data storage environment 10 while continuing to execute the first data storage system management application 32.

Figure 2:
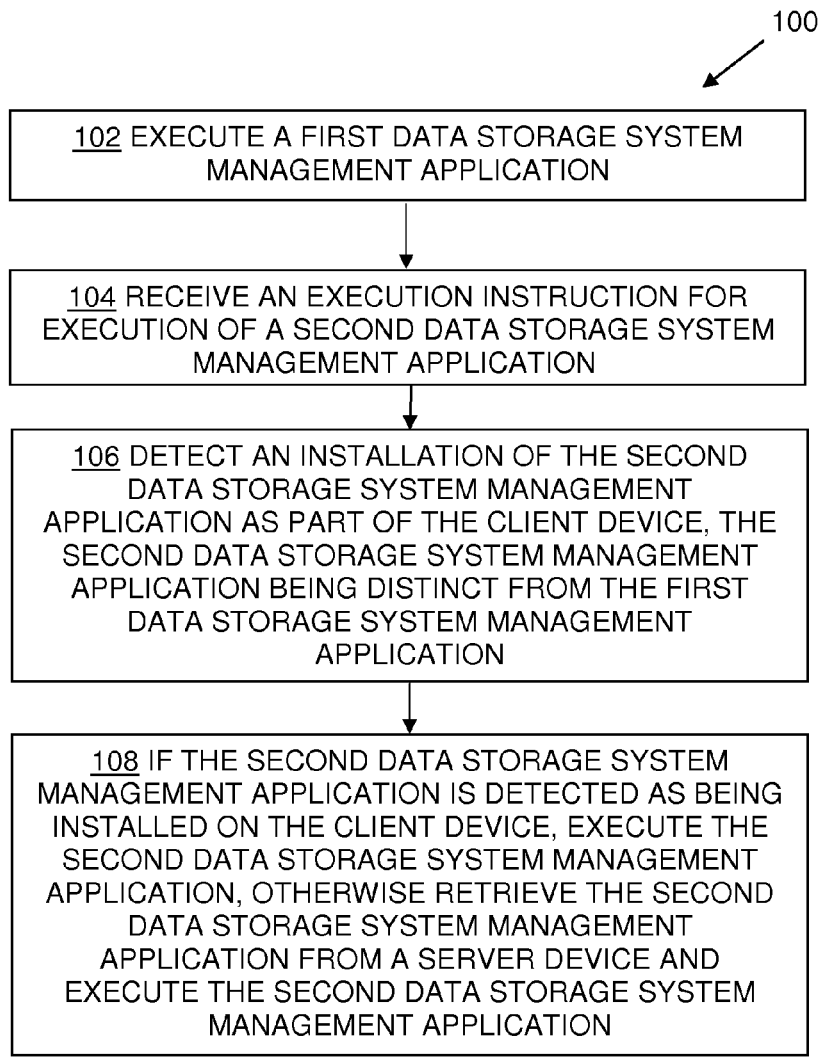
FIG. 2 is a flowchart that illustrates a procedure performed by a client device of the data storage environment of FIG. 1.

FIG. 2 is a flowchart 100 that illustrates a procedure performed by the client device 20 when controlling the activation of data storage system management applications, such as first and second data storage system management applications 32, 34.

Figure 3:
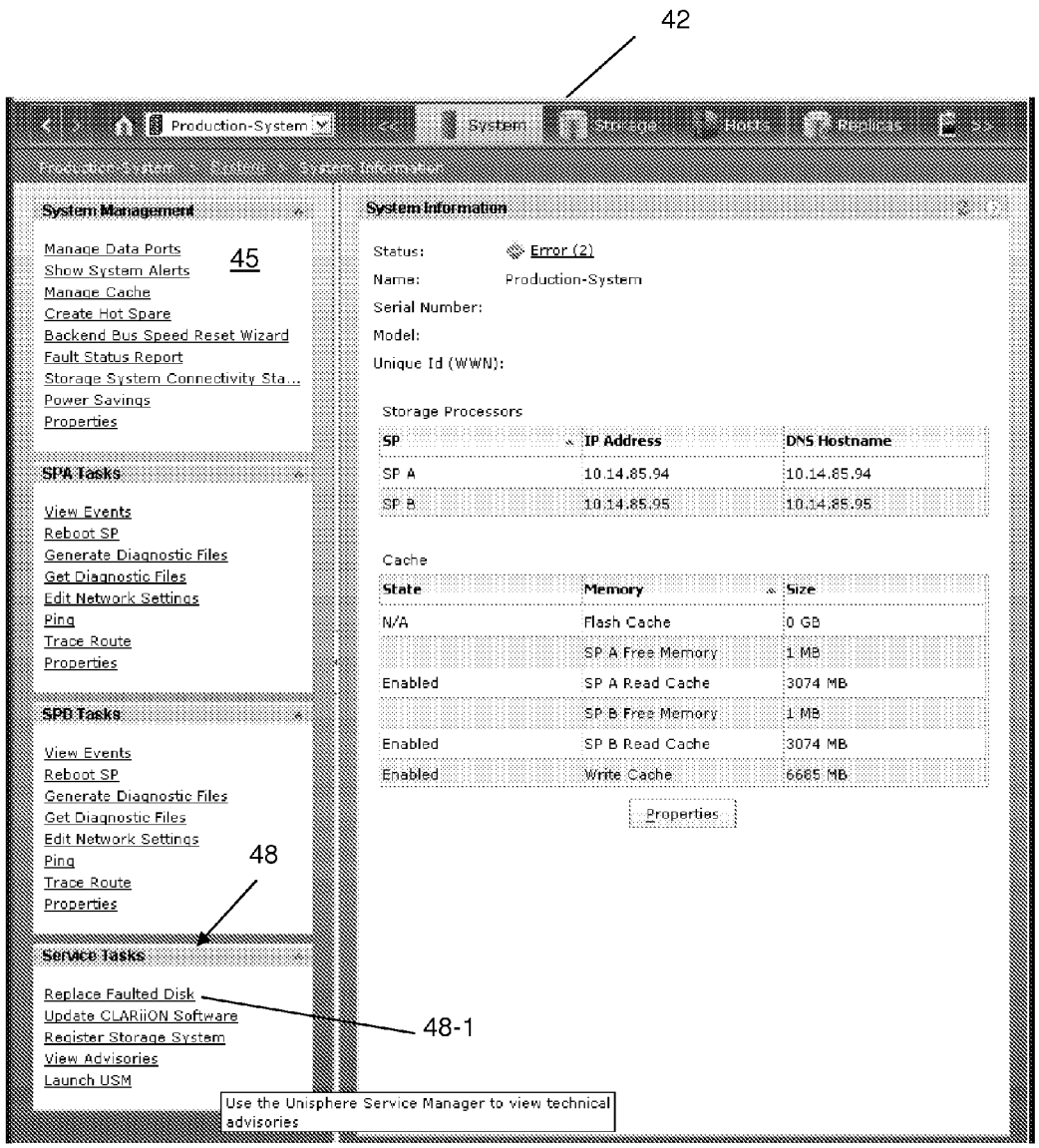
FIG. 3 is a graphical user interface (GUI) provided by the client device of FIG. 1 advertising the availability of a second data storage system management application as a link when executing a first data storage system management application.

In step 102, the client device 20 executes a first data storage system management application 32. For example, with reference to FIG. 1, assume a user initiates execution of the first data storage system management application 32, such as Navisphere Manager or Unisphere. During the execution process, the client device 20 requests the user to enter data storage information 36, such as navigation information 38 (e.g., an Internet Protocol address associated with the data storage system 22) and security information 40 (e.g., security credentials such as a secure username and an encrypted password). Upon receiving the data storage information 36, the client device 20 utilizes the data storage information 36 to establish communication between the first data storage system management application 32 and the data storage system 22. With the establishment of the communication, the client device 20 allows the user to manage and monitor the data storage system 22 through the first data storage system management application 32. For example, the client device 20 provides a primary data storage system management graphical user interface (GUI) 42 associated with the first data storage system management application 32 via a display 30, such as illustrated in FIG. 3. The client device 20 provides the primary data storage system management GUI 42 as the default management GUI that allows the user to navigate a variety of functions 45 associated with management of the data storage system 22 using the first data storage system management application 32.

Returning to FIG. 2, in step 104, the client device 20 receives an execution instruction for execution of a second data storage system management application 34. While the client device 20 can receive the execution instruction in a variety of ways, in one arrangement, the client device 20 receives the execution instruction via the first data storage system management application 32. For example, with reference to FIG. 3, the GUI 42 associated with the first data storage system management application 32 presents a set of executable functionalities 48, such as a set of links, buttons, screen hot-spots, etc., associated with the second data storage system management application 34. The executable functionalities 48 allow the user to navigate to and execute at least a portion of the second data storage system management application 34, such as a "Replace Faulted Disk" functionality 48-1 of the application 34. When the user activates a particular executable functionality 48, such as by clicking on the executable functionality 48 using a mouse controller (not shown), with reference to FIG. 1, the first data storage system management application 32 generates the execution instruction 46 and provides the execution instruction 46 to the client device 20 to initiate the second data storage system management application 34, such as an NST or USM application.

Returning to FIG. 2, in step 106, the client device 20 detects an installation of the second data storage system management application 34 as part of the client device 20, the second data storage system management application 34 being distinct from the first data storage system management application 32. For example, in one arrangement, the execution instruction 46 provides to the client device 20 an indication, such as a tag, regarding the particular second data storage system management application 34 that the user wishes to initiate. After the first data storage system management application 32 generates the execution instruction 46, the client device 20 compares the tag against the processes currently executed by the controller 24.

In step 108, if the second data storage system management application 34 is detected as being installed on the client device 20, the client device 20 executes the second data storage system management application 34, otherwise the client device 20 retrieves the second data storage system management application 34 from a server device and executes the second data storage system management application 34.

For example, assume the case where user selects the "Replace Faulted Disk" functionality 48-1 as presented by GUI 42 of the first data storage system management application 32. When the first data storage system management application 32 generates the execution instruction 46, in response to the selection, the first data storage system management application 32 includes a tag identifying the second data storage system management application 34 (e.g., NST or USM application) associated with the particular "Replace Faulted Disk" functionality 48-1. The client device 20 then compares the tag against the processes currently executed by the controller 24.

Figure 5:
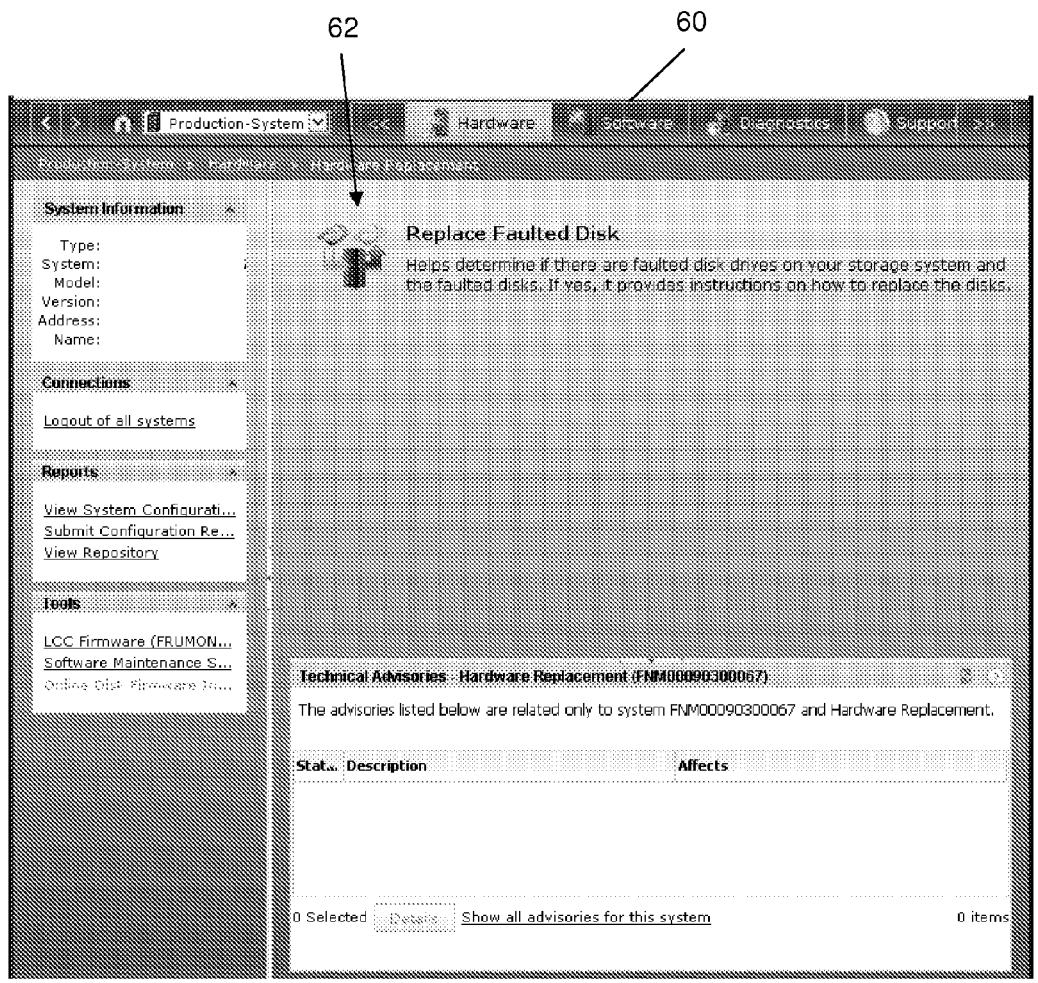
FIG. 5 is a GUI provided by the client device of FIG. 1 that allows the end user to execute the second data storage system management application.

Assume the case where the client device 20 detects the second data storage system management application 34, as identified by the tag, is installed as part of the controller 24 (e.g., that the client device 20 is already logged into the data storage system via the second data storage system management application 34). In such a case, the client device 20 can execute the second data storage system management application 34 to provide, via the display 30, a second GUI 60 associated with the second data storage system management application 34, as shown in FIG. 5. From this GUI 60, the user can manage a faulted disk associated with the data storage system 22. For example, the user can use a mouse to click the Replace Faulted Disk icon 60 and engage the Replace Faulted Disk functionality associated with the second data storage system management application 34.

Figure 4:
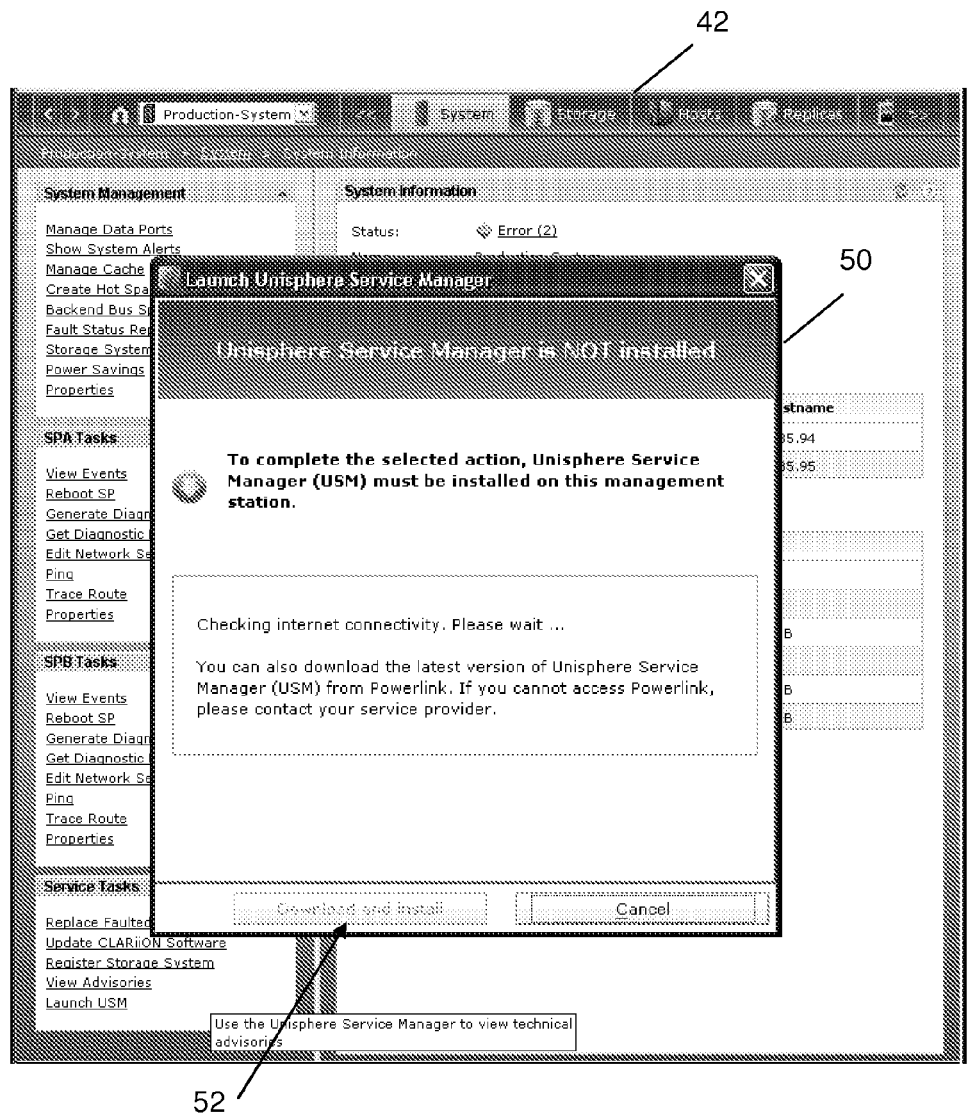
FIG. 4 is a GUI provided by the client device of FIG. 1 when the client device detects an absence of installation of the second data storage system management application as part of the client device.

In the case where the client device 20 detects that second data storage system management application 34, as identified by the tag, is absent from the controller 24, the client device 20 is configured to retrieve the second data storage system management application 34. For example, when the client device 20 detects an absence of the second data storage system management application 34, the client device 20 generates a dialog 50, as illustrated in FIG. 4, and display the dialog 50 to the user via display 30. The dialog 50 provides the user with a notification that the second data storage system management application 34, such as NST or UST, is not installed on the client device 20 and provides the user with the option of downloading and installing the second data storage system management application 34. For example, the dialog 50 provides a download and install functionality 52 that, when executed by the user, causes the client device 20 to automatically retrieve and install the second data storage system management application 34 without requiring additional user input.

While the client device 20 can retrieve the second data storage system management application 34 in a variety of ways, in one arrangement and with reference to FIG. 1, the client device 20 utilizes an application catalog 56 to find and retrieve the second data storage system management application 34 within the data storage environment 10. For example, the client device 20 is disposed in electrical communication with a server device 54, such as a POWERLINK server device produced by EMC Corporation of Hopkinton, Mass. The server device 54 is configured to collect identification information related to various aspects of the server device 54 and store the identification information as part of the application catalog 56. For example, the server device 54 generates an application catalog 56 having identification information 58 that for each computer program utilized by the data storage environment 10, such as the name, Uniform Resource Locator (URL), size, and version of each program.

The client device 20 receives the application catalog 56 from the server device 54 in response to the user executing the download and install functionality 52, illustrated in FIG. 4. Based upon a review of the identification information 58 contained in the catalog, the client device 20 can detect not only the presence of the second data storage system management application 34 in the server device 54 but the location of the second data storage system management application 34 on the server device 54. For example, the client device 20 can iterate through application catalog 56 to identify a particular second data storage system management application 34, as well as the location (e.g., URL) of the management application 34 based upon the identification information 58 contained in the application catalog 56.

The client device 20 then utilizes the location information, such as the URL, to retrieve the second data storage system management application 34, such as from the server device 54 as illustrated in FIG. 1. In one arrangement, during retrieval the client device 20 automatically exchanges security credentials with and automatically logs into the server device 54 without user intervention to obtain the second data storage system management application 34. Once retrieved and installed, the client device 20 executes the second data storage system management application 34 to provide, via the display 30, the second GUI 60 associated with the second data storage system management application 34, as shown in FIG. 5. From this GUI 60, the user can manage a faulted disk associated with the data storage system 22 by activating the Replace Faulted Disk icon 60.

With such a configuration, the client device 20 provides to a user the ability to launch or execute a second data storage system management application 34, such as an NST application, from a first data storage system management application 32. This permits the user to automatically navigate to the second data storage system management application 34 and provides the user with a better ease-of-use experience. Additionally, by presenting a set of executable functionalities 48 as part of the GUI associated with the first data storage system management application 32, the client device 20 effectively advertises the presence of the second data storage system management application 34 as part of the data storage environment 10. Such advertisement makes the management application 34 more noticeable to end users and minimizing the occurrence of service calls to support personnel for help in managing various aspects of the data storage system 22.

As indicated above and with reference to FIG. 5, when the client device 20 executes the second data storage system management application 34, the client device 20 generates a GUI 60 that allows a user to engage a particular functionality, such as a Replace Faulted Disk functionality, associated with the second data storage system management application 34. In one arrangement, prior to engaging the functionality, the second data storage system management application 34 receives navigation information 38 and security information 40 from the first data storage system management application 32. For example, after receiving the navigation information 38 and security information 40 from the first data storage system management application 32, the second data storage system management application 34 utilizes the navigation information 38, such as an Internet Protocol address associated with the data storage system 22, to initiate a communication session between the second data storage system management application 34 and the data storage system 22. The client device 20 then utilizes the security information 40, such as a secure username and an encrypted password, to validate the second data storage system management application 34 to the data storage system 22, such as via an authentication procedure, and to establish communication 48 between the second data storage system management application 34 and the data storage system 22. Once established, the second data storage system management application 34 can engage the particular functionality, such as a Replace Faulted Disk functionality, to manage the data storage system 22.

As indicated above, the client device 20 provides the primary data storage system management GUI 42, associated with the first data storage system management application 32, as the default management GUI. The GUI 42 allows the user to navigate a variety of functions 45 associated with management of the data storage system 22 using the first data storage system management application 32 and advertises a set of executable functionalities 48 associated with the second data storage system management application 34. In one arrangement, the client device 20 provides secondary data storage system management GUIs (i.e., that depend from the primary data storage system management GUI 42) associated with the first data storage management application 32 that also allows the user to activate one or more executable functionalities 48 associated with the second data storage system management application 34.

Figure 6:
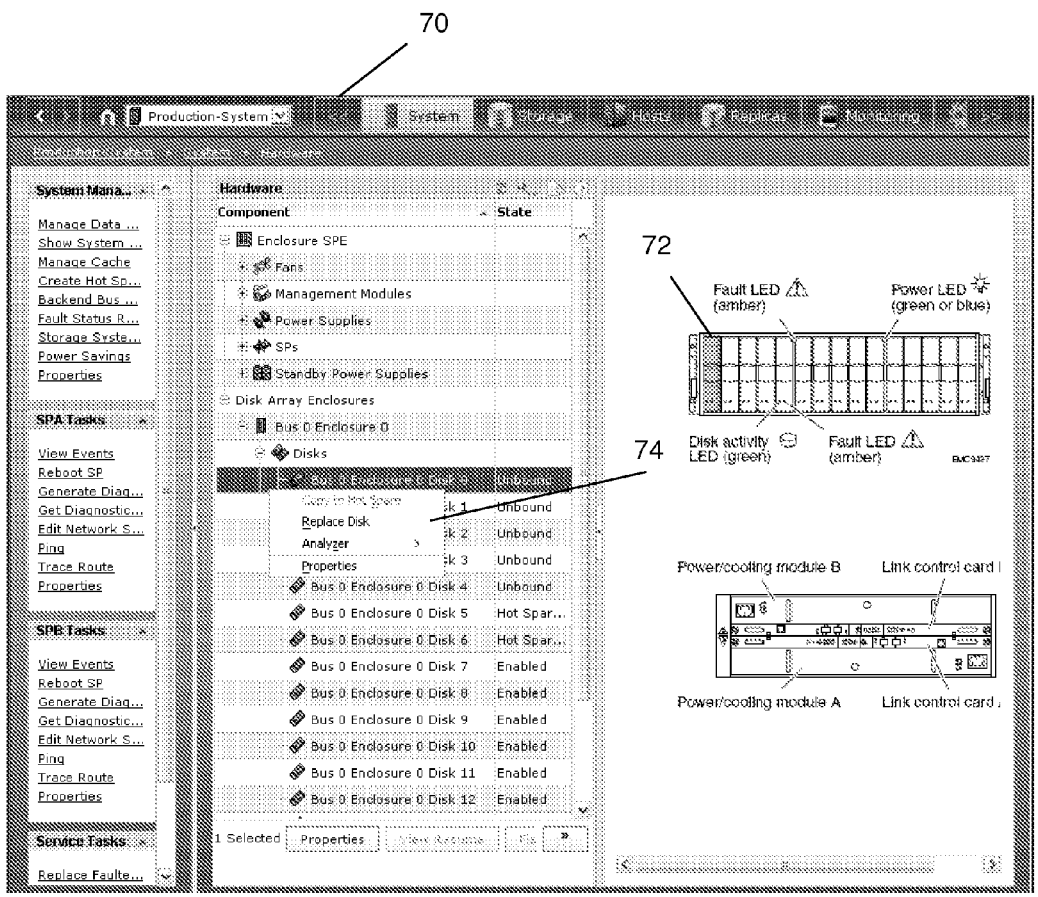
FIG. 6 is a GUI provided by the client device of FIG. 1 advertising the availability of a second data storage system management application as part of an alert.

For example, FIG. 6 illustrates an arrangement of a secondary data storage system management GUI 70, such as presented by the first data storage management application 32 as part of a Hardware page of the primary data storage system management GUI 42. As illustrated, the GUI 70 provides an indication 72 of a faulted component, such as a faulted disk in the data storage system 22, by highlighting an image of the faulted disk as part of a disk enclosure. When the user activates an executable functionality 74 to fix the faulted component, such by providing an activation command by clicking on the Replace Disk option of the hardware tree using a mouse controller, the first data storage system management application 32 generates an execution instruction 46 and provides the execution instruction 46 to the client device 20 to initiate execution of the second data storage system management application 34. As a result, the client device 20 then iterates through steps 106 and 108 of the flowchart illustrated in FIG. 2 to execute the second data storage system management application 34.

Figure 7:
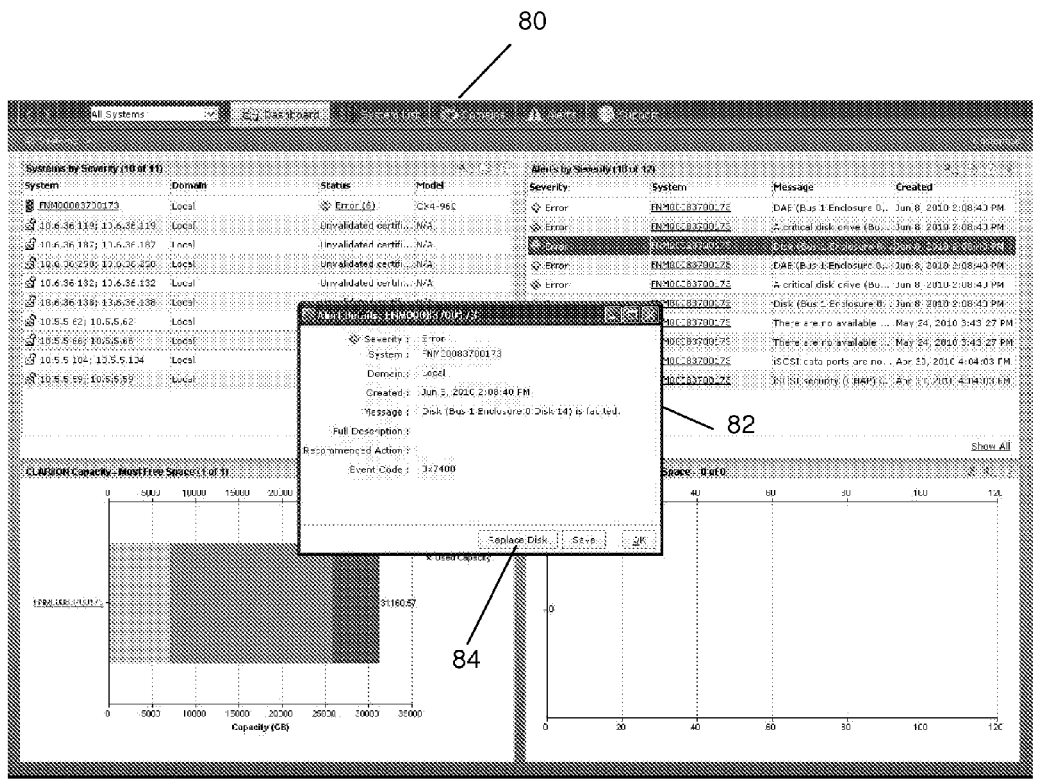
FIG. 7 is a GUI provided by the client device of FIG. 1 advertising the availability of a second data storage system management application as part of an alert.

In another example, FIG. 7 illustrates another arrangement of a secondary data storage system management GUI 80, such as presented by the first data storage management application 32 as part of an Enterprise page of the primary data storage system management GUI 42. As illustrated, the GUI 80 provides an indication of a faulted component, such as a faulted disk in the data storage system 22, by presenting a dialog 82 describing the fault. When the user activates an executable functionality 84, to fix the faulted component, such by providing an activation command by clicking on the Replace Disk button of the dialog 82 using a mouse controller, the first data storage system management application 32 generates an execution instruction 46 and provides the execution instruction 46 to the client device 20 to initiate execution of the second data storage system management application 34. As a result, the client device 20 then iterates through steps 106 and 108 of the flowchart illustrated in FIG. 2 to execute the second data storage system management application 34.

With such a configuration of the first data storage system management application 32, a user can launch the second data storage system management application 34 from a variety of GUI locations associated with the first data storage system management application 32. Accordingly, the client device 20 provides a relatively tight integration between the first data storage system management application 32 and the execution of the second data storage system management application 34.

While various embodiments of the invention have been particularly shown and described, it will be understood by those skilled in the art that various changes in form and details may be made therein without departing from the spirit and scope of the invention as defined by the appended claims.

For example, as indicated above, the primary data storage system management GUI 42 presents a set of executable functionalities 48, such as a set of links, buttons, screen hotspots, etc., associated with the second data storage system management application 34 that allow a user to navigate to and execute at least a portion of the second data storage system management application 34. Such indication is by way of example only. In one arrangement, with reference to FIG. 3, the primary data storage system management GUI 42 provides a subset of the total number of functionalities associated with the second data storage system management application 34. For example, assume the second data storage system management application 34 has a total of twenty distinct data storage system management functionalities. In order to minimize the time required by the user to scroll through all twenty functionalities to select a particular functionality for execution, the primary data storage system management GUI 42 presents a limited number of functionalities, such as the five most popular or most commonly used functionalities 48 as part of the GUI 42.

As indicated above, during operation, the client device 20 receives an execution instruction 46 from the first data storage system management application 32 and detects whether or not the second data storage system management application 34 has been installed as part of the client device 20. Such description is by way of example only. In one arrangement, client device performs additional detection operations in response to receiving the execution instruction 46 from the first data storage system management application 32. For example, the client device 20 detects the type of operating system executed by the controller 24 to ensure compatibility with the second data storage system management application 34. In another example, the client device 20 detects the presence or absence of network connectivity between the server device 54 and the client device 20 to allow for transfer of the second data storage system management application 34 from the server device 54.

What is claimed is:

1. A method for controlling activation of a data storage system management application, comprising:
   executing, by a client device, a first data storage system management application;
   receiving, by the client device, an execution instruction for execution of a second data storage system management application, the second data storage system management application being distinct from the first data storage system management application, the second data storage system management application being available on a server device;
   detecting, by the client device, whether the second data storage system management application is installed on the client device;
   if the second data storage system management application is detected as being installed on the client device:
      executing, by the client device, the second data storage system management application;
   if the second data storage system management application is detected as not being installed on the client device:
      retrieving, by the client device, the second data storage system management application from the server device, and
      executing, by the client device, the second data storage system management application;
   wherein the method comprises:
      presenting, by the client device and as part of a graphical user interface (GUI) associated with the first data storage management application, a set of executable functionalities associated with the second data storage system management application;
   wherein receiving the execution instruction for execution of a second data storage system management application comprises:
      receiving an execution command associated with an executable functionality of the set of executable functionalities presented as part of the GUI;
   wherein presenting, by the client device and as part of the GUI associated with the first data storage management application, the set of executable functionalities associated with the second data storage system management application comprises:
      presenting, by the client device and as part of a primary data storage system management GUI associated with the first data storage management application, a set of links, each link associated with a functionality of the second data storage system management application; and
   wherein receiving the execution command associated with the executable functionality of the set of executable functionalities presented as part of the GUI comprises:
      receiving an activation command associated with a link presented as part of the primary data storage system management GUI associated with the first data storage management application.

2. The method of claim 1, comprising presenting, by the client device, as the set of executable functionalities associated with the second data storage system management application a subset of the set of executable functionalities with the second data storage system management application.

3. A method for controlling activation of a data storage system management application, comprising:
   executing, by a client device, a first data storage system management application;
   receiving, by the client device, an execution instruction for execution of a second data storage system management application, the second data storage system management application being distinct from the first data storage system management application, the second data storage system management application being available on a server device;
   detecting, by the client device, whether the second data storage system management application is installed on the client device;
   if the second data storage system management application is detected as being installed on the client device:
      executing, by the client device, the second data storage system management application;
   if the second data storage system management application is detected as not being installed on the client device:
      retrieving, by the client device, the second data storage system management application from the server device, and
      executing, by the client device, the second data storage system management application;
   wherein the method comprises:
      presenting, by the client device and as part of a graphical user interface (GUI) associated with the first data storage management application, a set of executable functionalities associated with the second data storage system management application;
   wherein receiving the execution instruction for execution of a second data storage system management application comprises:
      receiving an execution command associated with an executable functionality of the set of executable functionalities presented as part of the GUI; and
   wherein presenting, by the client device and as part of the GUI associated with the first data storage management application, the set of executable functionalities associated with the second data storage system management application comprises:
      presenting, by the client device and as part of a secondary data storage system management GUI associated with the first data storage management application, the secondary data storage system management GUI depending from a primary data storage system management GUI associated with the first data storage management application, the set of executable functionalities associated with the second data storage system management application; and wherein receiving the execution command associated with the executable functionality of the set of executable functionalities presented as part of the GUI comprises: receiving an activation command associated with the executable functionality presented as part of the secondary data storage system management GUI.

4. The method of claim 1, wherein retrieving the second data storage system management application from the server device comprises:
receiving, by the client device and from the server device, an application catalog, the application catalog listing identification information of applications associated with the data storage system;
detecting, by the client device, a location of the second data storage system management application based upon the application catalog; and
retrieving, by the client device, the second data storage system management application from the identified location based upon the application catalog.

5. The method of claim 1, comprising:
providing, by the client device, navigation information related to the data storage system and security information relating to the data storage system, utilized by the first data storage system management application, to the second data storage system management application; and
executing, by the client device, the second data storage system management application to establish communication with the data storage system utilizing the navigation information.

6. The method of claim 5, wherein:
providing, by the client device, navigation information related to the data storage system and security information relating to the data storage system, utilized by the first data storage system management application, to the second data storage system management application comprises providing, by the client device, an Internet Protocol address associated with the data storage system and a security credential associated with the data storage system, as utilized by the first data storage system management application, to the second data storage system management application; and
executing, by the client device, the second data storage system management application to establish communication with the data storage system utilizing the navigation information comprises executing, by the client device, the second data storage system management application to establish communication with the data storage system utilizing the Internet Protocol address associated with the data storage system and the security credential associated with the data storage system.

7. An apparatus, comprising:
at least one communications interface; and
a controller electrically coupled to the at least one communications interface wherein the controller is configured to:
execute a first data storage system management application;
receive an execution instruction for execution of a second data storage system management application, the second data storage system management application being distinct from the first data storage system management application, the second data storage system management application being available on a server device;
detect whether of the second data storage system management application of is installed on the client device; and if the second data storage system management application is detected as being installed on the client device execute the second data storage system management application;
if the second data storage system management application is detected as not being installed on the client device:
retrieve the second data storage system management application from the server device and
execute the second data storage system management application; wherein the controller is configured to: present, by the client device and as part of a graphical user interface (GUI) associated with the first data storage management application, a set of executable functionalities associated with the second data storage system management application; wherein receiving the execution instruction for execution of a second data storage system management application comprises: receiving an execution command associated with an executable functionality of the set of executable functionalities presented as part of the GUI; wherein presenting, by the client device and as part of the GUI associated with the first data storage management application, the set of executable functionalities associated with the second data storage system management application comprises: presenting, by the client device and as part of a primary data storage system management GUI associated with the first data storage management application, a set of links, each link associated with a functionality of the second data storage system management application; and wherein receiving the execution command associated with the executable functionality of the set of executable functionalities presented as part of the GUI comprises: receiving an activation command associated with a link presented as part of the primary data storage system management GUI associated with the first data storage management application.

8. The apparatus of claim 7, wherein the controller is configured to present as the set of executable functionalities associated with the second data storage system management application a subset of the set of executable functionalities with the second data storage system management application.

9. The apparatus of claim 7, wherein when retrieving the second data storage system management application from the server device, the controller is configured to:
receive from the server device, an application catalog, the application catalog listing identification information of applications associated with the data storage system;
detect a location of the second data storage system management application based upon the application catalog; and
retrieve the second data storage system management application from the identified location based upon the application catalog.

10. The apparatus of claim 7, wherein the controller is configured to:
provide navigation information related to the data storage system and security information relating to the data storage system, utilized by the first data storage system management application, to the second data storage system management application; and
execute the second data storage system management application to establish communication with the data storage system utilizing the navigation information.

11. The apparatus of claim 10, wherein:
when providing navigation information related to the data storage system and security information relating to the data storage system, utilized by the first data storage system management application, to the second data storage system management application the controller is configured to provide an Internet Protocol address associated with the data storage system and a security credential associated with the data storage system, as utilized by the first data storage system management application, to the second data storage system management application; and when executing the second data storage system management application to establish communication with the data storage system utilizing the navigation information the controller is configured to execute the second data storage system management application to establish communication with the data storage system utilizing the Internet Protocol address associated with the data storage system and the security credential associated with the data storage system.

12. An apparatus, comprising:
at least one communications interface; and
a controller electrically coupled to the at least one communications interface wherein the controller is configured to:
execute a first data storage system management application;
receive an execution instruction for execution of a second data storage system management application, the second data storage system management application being distinct from the first data storage system management application, the second data storage system management application being available on a server device;
detect whether the second data storage system management application is installed on the client device; and
if the second data storage system management application is detected as being installed on the client device:
execute the second data storage system management application;
if the second data storage system management application is detected as not being installed on the client device:
retrieve the second data storage system management application from the server device, and
execute the second data storage system management application wherein the controller is configured to:
present, by the client device and as part of a graphical user interface (GUI) associated with the first data storage management application, a set of executable functionalities associated with the second data storage system management application;
wherein receiving the execution instruction for execution of a second data storage system management application comprises:
receiving an execution command associated with an executable functionality of the set of executable functionalities presented as part of the GUI;
wherein when presenting as part of the GUI associated with the first data storage management application, the set of executable functionalities associated with the second data storage system management application, the controller is configured to:
present as part of a secondary data storage system management GUI associated with the first data storage management application, the secondary data storage system management GUI depending from a primary data storage system management GUI associated with the first data storage management application, the set of executable functionalities associated with the second data storage system management application; and wherein when receiving the execution command associated with the executable functionality of the set of executable functionalities presented as part of the GUI, the controller is configured to:
receive an activation command associated with the executable functionality presented as part of the secondary data storage system management GUI.

13. A computer program product having a non-transitory computer-readable medium including computer program logic encoded thereon that, when performed on a controller of an apparatus, causes the apparatus to:
execute a first data storage system management application;
receive an execution instruction for execution of a second data storage system management application, the second data storage system management application being distinct from the first data storage system management application, the second data storage system management application being available on a server device;
detect whether the second data storage system management application is installed on the client device; and
if the second data storage system management application is detected as being installed on the client device:
execute the second data storage system management application;
if the second data storage system management application is detected as not being installed on the client device:
retrieve the second data storage system management application from the server device, and
execute the second data storage system management application;
wherein the computer-readable medium includes computer program logic encoded thereon that causes the apparatus to:
present, by the client device and as part of a graphical user interface (GUI) associated with the first data storage management application, a set of executable functionalities associated with the second data storage system management application;
wherein receiving the execution instruction for execution of a second data storage system management application comprises:
receiving an execution command associated with an executable functionality of the set of executable functionalities presented as part of the GUI;
wherein presenting, by the client device and as part of the GUI associated with the first data storage management application, the set of executable functionalities associated with the second data storage system management application comprises:
presenting, by the client device and as part of a primary data storage system management GUI associated with the first data storage management application, a set of links, each link associated with a functionality of the second data storage system management application; and
wherein receiving the execution command associated with the executable functionality of the set of executable functionalities presented as part of the GUI comprises:
receiving an activation command associated with a link presented as part of the primary data storage system management GUI associated with the first data storage management application.

14. The apparatus of claim 13, wherein the computer-readable medium includes computer program logic encoded thereon that causes the apparatus to present as the set of executable functionalities associated with the second data storage system management application a subset of the set of executable functionalities with the second data storage system management application.

15. The computer program product of claim 13, wherein when retrieving the second data storage system management application from the server device, the computer-readable medium includes computer program logic encoded thereon that causes the apparatus to:
receive from the server device, an application catalog, the application catalog listing identification information of applications associated with the data storage system;
detect a location of the second data storage system management application based upon the application catalog; and
retrieve the second data storage system management application from the identified location based upon the application catalog.

16. The computer program product of claim 13, wherein the computer-readable medium includes computer program logic encoded thereon that causes the apparatus to:
provide navigation information related to the data storage system and security information relating to the data storage system, utilized by the first data storage system management application, to the second data storage system management application; and
execute the second data storage system management application to establish communication with the data storage system utilizing the navigation information.

17. The computer program product of claim 16, wherein:
when providing navigation information related to the data storage system and security information relating to the data storage system, utilized by the first data storage system management application, to the second data storage system management application the controller is configured to provide an Internet Protocol address associated with the data storage system and a security credential associated with the data storage system, as utilized by the first data storage system management application, to the second data storage system management application; and
when executing the second data storage system management application to establish communication with the data storage system utilizing the navigation information the controller is configured to execute the second data storage system management application to establish communication with the data storage system utilizing the Internet Protocol address associated with the data storage system and the security credential associated with the data storage system.

18. The computer program product as in claim 13, wherein when presenting as part of the GUI associated with the first data storage management application, the set of executable functionalities associated with the second data storage system management application, the computer-readable medium includes computer program logic encoded thereon that causes the apparatus to:
present as part of a secondary data storage system management GUI associated with the first data storage management application, the secondary data storage system management GUI depending from a primary data storage system management GUI associated with the first data storage management application, the set of executable functionalities associated with the second data storage system management application; and
wherein when receiving the execution command associated with the executable functionality of the set of executable functionalities presented as part of the GUI, the computer-readable medium includes computer program logic encoded thereon that causes the apparatus to:
receive an activation command associated with the executable functionality presented as part of the secondary data storage system management GUI.

19. A computer program product having a non-transitory computer-readable medium including computer program logic encoded thereon that, when performed on a controller of an apparatus, causes the apparatus to:
execute a first data storage system management application;
receive an execution instruction for execution of a second data storage system management application, the second data storage system management application being distinct from the first data storage system management application, the second data storage system management application being available on a server device;
detect whether he second data storage system management application is installed on the client device; and
if the second data storage system management application is detected as being installed on the client device:
execute the second data storage system management application;
if the second data storage system management application is detected as not being installed on the client device:
retrieve the second data storage system management application from the server device, and
execute the second data storage system management application;
wherein the computer-readable medium includes computer program logic encoded thereon that causes the apparatus to:
present, by the client device and as part of a graphical user interface (GUI) associated with the first data storage management application, a set of executable functionalities associated with the second data storage system management application;
wherein receiving the execution instruction for execution of a second data storage system management application comprises:
receiving an execution command associated with an executable functionality of the set of executable functionalities presented as part of the GUI;
wherein when presenting as part of the GUI associated with the first data storage management application, the set of executable functionalities associated with the second data storage system management application, the computer-readable medium includes computer program logic encoded thereon that causes the apparatus to:
present as part of a secondary data storage system management GUI associated with the first data storage management application, the secondary data storage system management GUI depending from a primary data storage system management GUI associated with the first data storage management application, the set of executable functionalities associated with the second data storage system management application; and
wherein when receiving the execution command associated with the executable functionality of the set of executable functionalities presented as part of the GUI, the computer-readable medium includes computer program logic encoded thereon that causes the apparatus to:

receive an activation command associated with the executable functionality presented as part of the secondary data storage system management GUI.

* * * * *